> United States Patent Office 3,749,703
Patented July 31, 1973

3,749,703
ASN¹⁵-BOVINE THYROCALCITONIN
Stephen Guttmann, Allschwil, Edmond Sandrin and Janos Pless, Basel, and Hans Willems, Allschwil, Switzerland, assignors to Sandoz Ltd. (also known as Sandoz AG), Basel, Switzerland
No Drawing. Filed Jan. 23, 1970, Ser. No. 5,358
Claims priority, application Switzerland, Jan. 31, 1969, 1,508/69; Apr. 17, 1969, 5,814/69
Int. Cl. C07c 103/52; C07g 7/00
U.S. Cl. 260—112.5                         1 Claim

ABSTRACT OF THE DISCLOSURE

The invention concerns the novel polypepetide of the formula:

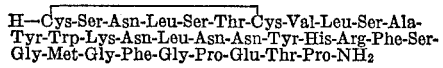

H—Cys-Ser-Asn-Leu-Ser-Thr-Cys-Val-Leu-Ser-Ala-
Tyr-Trp-Lys-Asn-Leu-Asn-Asn-Tyr-His-Arg-Phe-Ser-
Gly-Met-Gly-Phe-Gly-Pro-Glu-Thr-Pro-NH₂

The polypeptide is useful in lowering the calcium content in plasma.

---

The present invention relates to a hitherto unknown polypeptide of Formula I,

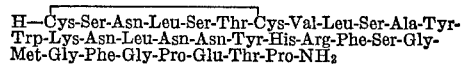

H—Cys-Ser-Asn-Leu-Ser-Thr-Cys-Val-Leu-Ser-Ala-Tyr-
Trp-Lys-Asn-Leu-Asn-Asn-Tyr-His-Arg-Phe-Ser-Gly-
Met-Gly-Phe-Gly-Pro-Glu-Thr-Pro-NH₂ its therapeutically active acid addition salts, its heavy metal complexes, processes for the production of this compound and its acid addition salts, as well as pharmaceutical preparation.

The hitherto unknown polypeptide of Formula I may be produced by methods for the synthesis of compounds of this type in actual use or described in the literature on the subject, whereby the disulfide bridge is formed at an appropriate stage of the synthesis.

The condensation of peptide units may, for example, be effected by reacting a peptide unit having a protected α-amino group and an activated terminal carboxyl radical with a peptide unit having a free α-amino group and a free or protected terminal carboxyl radical. It is to be understood that the term peptide unit includes a single amino acid.

The carboxyl radical may, for example, be activated by conversion into an acid azide, anhydride, imidazolide, isoxazolide or an activated ester, or by reaction with a carbodiimide or N,N'-carbonyl-diimidazole.

The preferred condensation methods are the carbodiimide method, the azide method, the method of the activated esters, the anhydride method and the Merrifield method. In the last stage of the condensation it is convenient to employ a method avoiding or minimizing racemization, e.g. by using the azide or activated ester method, whereby activation is conveniently effected with N-hydroxysuccinimide.

The free functional groups which do not participate in the reaction may be protected as follows during the building up of the hitherto unknown peptide:

With reference to partial sequence A, described hereinafter, a suitable radical for blocking the γ-carboxyl radical is the tert.butyloxy radical, but other protective radicals, such as the methoxy, the ethoxy, the tert.amyloxy, the amide or the benzyloxy radical, may likewise be used.

With reference to partial sequence C, described hereinafter, a suitable radical for blocking the imidazol radical of the histidine radical is the triphenylmethyl radical, but other suitable protective radicals, such as the carbo-tert. butoxy, the carbo-tert.amyloxy, the carbobenzoxy or the benzyl radical, may likewise be used.

With reference to partial sequence C, described hereinafter, a suitable radical for blocking the guanido radical of the arginine radical is the nitro radical, but other suitable protective radicals, such as the tosyl radical, the p-nitrocarbobenzoxy radical or the 2 - (isopropyloxycarbonyl)-3,4,5,6-tetrachlorobenzoyl radical, may likewise be used. It is also possible to use the protective effect of the protonization of the guanido radical during the synthesis.

With reference to partial sequence D, described hereinafter, a suitable radical for blocking the ω-amino radical of the lysine radical is a carbo-tert.alkoxy radical, preferably the carbo-tert.butoxy radical.

With reference to partial sequences F1 and F2, described hereinafter, the benzyl or trityl radical is preferably used as mercapto protective radical of the cystine groups. The benzyl or trityl radicals used for the protection of the SH radicals during the synthesis of partial sequence F are usually split off at the end of the synthesis by treatment with sodium in liquid ammonia. It has now been found that the splitting off of the benzyl or trityl protective radical and the formation of the S—S bridge before the last stage of the build up lead to particularly high yields of final product.

The conversion of a protected mercapto or amino radical into a free radical, as well as the conversion of a functionally modified carboxyl radical into a free carboxyl radical during the course of the process for the production of the new polypeptide of Formula I is effected in manner known per se by treatment with hydrolyzing or reducing agents.

The starting materials for producing the new polypeptide of Formula I, insofar as they were hitherto unknown, may be obtained by methods for the synthesis of peptides in actual use or described in the literature, whereby the amino acids may be joined one at a time or after the formation of smaller peptide units.

The new polypeptide of Formula I may likewise be obtained and used in the form of its salts. Examples of salts are those with organic acids, e.g. acetic, lactic, succinic, benzoic, salicylic, methanesulphonic or toluenesulphonic acid, as well as polymeric acids such as tannic acid or carboxymethyl cellulose, and salts with inorganic acids such as hydrohalic acids, e.g. hydrochloric acid, or sulphuric acid or phosphoric acid. An example of a heavy metal complex is a complex formed wtih zinc⊕⊕.

The polypeptide I is useful because it possesses pharmacological activity in animals. In particular, the polypeptide is useful for lowering the calcium content in plasma. For example, as observed from biological testing in rats, the calcium-lowering effect is 500±100 MRC units per mg. of peptide.

For the above-mentioned use, the dosage administered will, of course, vary depending upon the mode of administration and treatment desired. However, in general, satisfactory results are obtained with a single dose of from about 1 to about 10 units per kilogram of animal body weight. For the larger mammals, a suitable total daily dose contains from about 70 to about 700 units, which may be administered in a single dose or in divided portions. A suitable form for intramuscular administration contains about 70 to 700 units of the active compound, mixed with a liquid carrier.

The following abbreviations are used in this specification:

Z=carbobenzoxy (benzyloxycarbonyl)
Bzl=benzyl
BOC=tert.butyloxycarbonyl
Trt=trityl=triphenylmethyl
OTB=tert.butyloxy
ONP=p-nitrophenyl ester
OCP=2,4,5-trichlorophenoxy
OSu=N-hydroxysuccinimide OMe=methoxy
OEt=ethoxy
NO₂=nitro
Ser=L-seryl
Asn=L-asparaginyl
Leu=L-leucyl
Lys=L-lysyl
Thr=L-threonyl
Val=L-valyl
Ala=L-alanyl Tyr=L-tyrosyl
Trp=L-tryptophanyl
Arg=L-arginyl
Phe=L-phenylalanyl
Glu=L-glutamyl
His=L-histidyl
Pro=L-prolyl
Gly=glycyl
Met=L-methionyl
Cys=L-cysteinyl

PART 1

```
            Bzl                                      Bzl
             |                                        |
BOC— | Cys  Ser  Asn  Leu  Ser | —NHNH₂   H— | Thr  Cys  Val  Leu | —OH

Partial sequence F2                     Partial sequence F1

Bzl                                      Bzl
             |                                        |
BOC— | Cys  Ser  Asn  Leu  Ser |              Thr  Cys  Val  Leu | —OH

BOC— | Cys  Ser  Asn  Leu  Ser              Thr  Cys  Val  Leu | —OH
     |_____|

Partial sequence F

BOC— | Cys  Ser  Asn  Leu  Ser              Thr  Cys  Val  Leu |
     |_____|

H— | Cys  Ser  Asn  Leu  Ser              Thr  Cys  Val  Leu |
   |_____|
```

PART 2

```
                                        BOC                               Trt
                                         |                                 |
Trt— | Ser Ala Tyr Trp |—NHNH₂   H— | Lys Asn Leu Asn Asn Tyr |—OMe   Trt— | His Arg Phe |—NHNH₂

Partial sequence E                Partial sequence D                 Partial sequence C BOC                               Trt
                                         |                                 |
Trt— | Ser Ala Tyr Trp |             Lys Asn Leu Asn Asn Tyr |—OMe   Trt— | His Arg Phe |

BOC
                                         |
Trt— | Ser Ala Tyr Trp             Lys Asn Leu Asn Asn Tyr |—NHNH₂   H— | His Arg Phe |

Partial sequence DE
                                        BOC
                                         |
Trt— | Ser Ala Tyr Trp             Lys Asn Leu Asn Asn Tyr              His Arg Phe |

BOC
                                         |
H— | Ser Ala Tyr Trp              Lys Asn Leu Asn Asn Tyr              His Arg Phe |

Partial sequence ABCDE
                                        BOC
                                         |
    Ser Ala Tyr Trp               Lys Asn Leu Asn Asn Tyr              His Arg Phe Partial sequence ABCDEF
                  Example Ser Ala Tyr Trp               Lys Asn Leu Asn Asn Tyr              His Arg Phe
```

PART 3

```
                                           OTB
                                            |
BOC— | Ser Gly Met Gly |—OH   H— | Phe Gly Pro Glu Thr Pro |—NH₂

Partial sequence B           Partial sequence A
                                           OTB
                                            |
BOC— | Ser Gly Met Gly            Phe Gly Pro Glu Thr Pro |—NH₂

H— | Ser Gly Met Gly              Phe Gly Pro Glu Thr Pro |—NH₂
```

PART 3—Continued

| Partial sequence B | Partial sequence A | |
|---|---|---|
| Ser Gly Met Gly | Phe Gly Pro Glu Thr Pro | —NH₂ |
| Ser Gly Met Gly | Phe Gly Pro Glu Thr Pro | —NH₂ |

Partial sequence ABC

| | | |
|---|---|---|
| Ser Gly Met Gly | Phe Gly Pro Glu Thr Pro | —NH₂ |
| Ser Gly Met Gly | Phe Gly Pro Glu Thr Pro | —NH₂ |
| Ser Gly Met Gly | Phe Gly Pro Glu Thr Pro | —NH₂ |
| Ser Gly Met Gly | Phe Gly Pro Glu Thr Pro | —NH₂ |

In the following example, which illustrates the process without in any way limiting the scope of the invention, all temperatures are indicated in degrees centigrade. The optical rotations were determined with a concentration of 1 mol/liter.

EXAMPLE

H—Cys-Ser-Asn-Leu-Ser-Thr-Cys-Val-Leu-Ser-Ala-Tyr-Trp-Lys-Asn-Leu-Asn-Asn-Tyr-His-Arg-Phe-Ser-Gly-Met-Gly-Phe-Gly-Pro-Glu-Thr-Pro-NH₂·hexaacetate·decahydrate 3.3 g. of partial sequence ABCDEF are dissolved in 100 cc. of trifluoroacetic acid in an atmosphere of nitrogen, the solution is allowed to stand at 20° for 15 minutes and is then evaporated to dryness. The residue is dissolved in 300 cc. of 0.2 N acetic acid, the solution is treated with 20 cc., of amberlite-IRA–310 (acetate), is lyophilized, washed with diethyl ether and dried over potassium hydroxide in a high vacuum. The title compound, having a M.P. of 220° (decomp.), $[\alpha]_D^{20} = -42°$ in N acetic acid, is obtained.

Composition of amino acids after acid hydrolysis (6 N, 16 hours): Ala$_{1.1}$, Arg$_{1.0}$, Asp$_{3.9}$, Cys/2$_{1.6}$, Glu$_{1.2}$, Gly$_{3.0}$, His$_{1.1}$, Lys$_{1.1}$, Leu$_{2.9}$, Met$_{1.0}$, Phe$_{2.0}$, Pro$_{2.1}$, Ser$_{3.8}$, Thr$_{1.9}$, Tyr$_{2.0}$, Val 0.9 (Trp 1.0 by spectrophotometry).

The starting material used in the example is produced as follows:

Partial sequence A:
H-Phe-Gly-Pro-Glu(OTB)-Thr-Pro-NH₂

134 g. of Z-Thr-NH-NH₂ are dissolved at —5° in 2 liters of N hydrochloric acid, and 0.55 liter of N sodium nitrite are added. After 5 minutes potassium carbonate is added until the pH of the solution amounts to 9, the resulting azide is extracted with ethyl acetate, and a solution of 80 g. of H-Pro-NH₂·hydrochloride in 100 cc. of water, 500 cc. of dimethyl formamide and 77 cc. of triethyl amine is added. The ethyl acetate is evaporated at 20° in a vacuum and the solution is allowed to stand at 25° overnight. The remaining solution is concentrated by evaporation in a vacuum, the residue is dissolved in ethyl acetate, the solution is washed with water, dilute hydrochloric acid and aqueous potassium carbonate solution and is dried over sodium sulphate. The solution is evaporated in a vacuum, the residue is dissolved in warm ethyl acetate and is cooled. Z-Thr-Pro-NH₂, having a M.P. of 148°, $[\alpha]_D^{20} = -72°$ in 95% acetic acid, is obtained. 90 g. of Z-Thr-Pro-NH₂ are subsequently dissolved in 2 liters of dioxane and 260 cc. of N hydrochloric acid, and the solution is hydrogenated at 20° and normal pressure in the presence of a palladium catalyst. Filtration is effected, the solution is evaporated in a vacuum, the residue is washed with ethyl acetate, whereby H-Thr-Pro-NH₂·HCl, having a M.P. of 216°, $[\alpha]_D^{20} = -64°$ in 95% acetic acid, is obtained. This product is dissolved in 500 cc. of dimethylformamide, 50 cc. of water and 32 cc. of triethyl amine, and 118 g. of Z-Glu(OTB)-OCP and 800 cc. of tetrahydrofuran are added. The solution is allowed to stand overnight at 20°, is evaporated in a vacuum, and the residue is crystallized with diethyl ether. Z-Glu-(OTB)-Thr-Pro-NH₂, having a M.P. of 65° (decomp.), $[\alpha]_D^{20} = -18°$ in dimethyl formamide, is obtained. 80 g. of Z-Glu(OTB)-Thr-Pro-NH₂ are dissolved in 1.5 liters of dioxane and 200 cc. of water, and hydrogenation is effected at 20° and normal pressure in the presence of a palladium catalyst. The solution is filtered and evaporated in a vacuum, and diethyl ether is added to the residue, whereby H-Glu(OTB)-Thr-Pro-NH₂, having a M.P. of 65° (decomp.), $[\alpha]_D^{20} = -28°$ in dimethyl formamide, is obtained. This product is dissolved in 700 cc. of dimethyl formamide at 0°, 200 cc. of acetonitrile, 68 g. of Z-Phe-Gly-Pro-OH, 18 g. of N-hydroxysuccinimide and 32 g. of dicyclohexyl carbodiimide are added, the mixture is allowed to stand at 20° over night, is filtered, the solution is concentrated by evaporation in a vacuum and ethyl acetate is added. The solution is subsequently washed with water, dilute hydrochloric acid and an aqueous potassium carbonate solution, is dried over sodium sulphate, evaporated in a vacuum, and the residue is crystallized from ethyl acetate/diethyl ether.

Z-Phe-Gly-Pro-Glue(OTB)-Thr-Pro-NH₂, having a M.P. of 120° (decomp.), $[\alpha]_D^{20} = -66°$ in dimethyl formamide, is obtained. This product is dissolved in 1500 cc. of dioxane and 300 cc. of water, 30 g. of palladium charcoal (10%) are added to the solution and hydrogenation is effected until the taking up of hydrogen is completed. Filtration is effected, the filtrate is evaporated and the residue is crystallized from dioxane. Partial sequence A, having a M.P. of 153°, $[\alpha]_D^{20} = -79°$ in dimethyl formamide, is obtained.

Partial sequence B: BOC-Ser-Gly-Met-Gly-OH (a) H-Met-Gly-OEt·HCl.—65 g. of BOC-Met-OH are dissolved in 900 cc. of chloroform, the solution is cooled to —10°, 30 cc. of N-methyl morpholine and 35.6 g. of chloroformic acid isobutyl ester are added. After ten minutes a solution of 30 g. of glycine ethyl ester in 200 cc. of chloroform is slowly added, and the solution is allowed to react at 20° for 1 hour. The solution is extracted with 0.5 N ammonium hydroxide, then with 0.2 N sulphuric acid, is washed with water until neutral, is dried over sodium sulphate and concentrated by evaporation. After recrystallization from petroleum ether BOC-Met-Gly-OEt, having a M.P. of 49°, $[\alpha]_D^{20} = -19°$ in ethanol, is obtained. This product is dissolved in 750 cc. of 4 N hydrochloric acid/ethanol, the solution is allowed to stand at 25° for 1 hour, is evaporated, the residue is washed with diethyl ether and dried until a constant weight is obtained. The compound indicated in heading (a) is obtained in the form of an oil.

(b) BOC-Ser-Gly-OEt.—12.5 g. of N-tert.butyloxycarbonyl-serine are dissolved in 100 cc. of chloroform, and 6.1 g. of N-methyl morpholine are added; 8.2 g. of chloroformic acid isobutyl ester are subsequently added dropwise. After 10 minutes a solution of 6.6 g. of glycine ethyl ester in 50 cc. of chloroform is added and the solution is stirred at room temperature for 1 hour. The reaction mixture is washed with dilute ammonia, then with hydrochloric acid solution, is dried over sodium sulphate, and the organic phase is evaporated. The compound indicated in heading (b) is obtained as an oil. $[\alpha]_D^{20} = -3°$ in dimethyl formamide.

(c) BOC-Ser-Gly-NH-NH$_2$.—19.4 g. of BOC-Ser-Gly-OEt are dissolved in 270 cc. of ethyl alcohol, 48.6 cc. of hydrazine hydrate are added, and the solution is allowed to stand at room temperature for 2 days. The solution is subsequently evaporated and the residue is crystallized from a mixture (1:3) of methyl alcohol/diethyl ether. The compound indicated in heading (c), having a M.P. of 157°, $[\alpha]_D^{20} = -5°$ in dimethyl formamide, is obtained.

(d) BOC-Ser-Gly-Met-Gly-OEt.—25 cc. of a 4 N hydrogen chloride solution in ethyl ether are added to 200 cc. of dimethyl formamide, and 11 g. of BOC-Ser-Gly-NH-NH$_2$ are dissolved in this solution at —10°. 5.4 cc. of tert.butyl nitrite are subsequently added dropwise at —10°, 18 cc. of triethyl amine are first added to the solution, and then a solution of 12 g. of H-Met-Gly-OEt.HCl in 100 cc. of dimethyl formamide and 6.2 cc. of triethyl amine is added. The solution is stirred at room temperature for 3 hours, is filtered after 12 hours and concentrated by evaporation. The residue is dissolved in chloroform, is successively washed with dilute ammonia and hydrochloride acid solution, is dried over sodium sulphate and evaporated. The compound indicated in heading (d), having an optical rotation of $[\alpha]_D^{20} = -14°$ in dimethyl formamide, is obtained.

(e) Partial sequence B.—24 g. of

BOC-Ser-Gly-Met-Gly-OEt are dissolved in 250 cc. of dioxane, 75 cc. of N sodium hydroxide solution are added, the solution is stirred at 25° for 1 hour, is treated with 150 cc. of Dowex-50 (H+ form), is filtered, the filtrate is evaporated and the residue is crystallized from ethyl acetate/diethyl ether. Partial sequence B, having a M.P. of 87° (decomp.), $[\alpha]_D^{20} = -17°$ in dimethyl formamide, is obtained.

Partial sequence C: Trt-His(Trt)-Arg-Phe-NH-NH$_2$.HCl (a) Z-Arg(NO$_2$)-Phe-OMe.—51.8 g. of H-Phe-OMe.HCl are dissolved in 1 liter of diethyl ether and about 50 cc. of ice water, and a sufficient amount of sodium carbonate is added while stirring and cooling until all the water has been taken up. Filtration is effected and the filtrate is evaporated until a constant weight is obtained, whereby a colourless oil results.

67.6 g. of Z-Arg(NO$_2$)-OH are dissolved in 300 cc. of acetonitrile and 150 cc. of dimethyl formamide, and 41.2 g. of H-Phe-OMe are added. The solution is then cooled to —20° and a solution of 43.4 g. of dicyclohexyl carbodiimide in 100 cc. of acetonitrile is added. The reaction mixture is allowed to stand in a refrigerator for 4 hours with occasional stirring. The resulting precipitate is filtered off and the filtrate concentrated by evaporation. The evaporation residue is dissolved in 1 liter of ethyl acetate and is subsequently rewashed in the cold with N sodium hydroxide solution, water, N sulphuric acid, water, and a saturated common salt solution. The ethyl acetate phase which has been dried over sodium sulphate is completely concentrated by evaporation. After recrystallization from ethyl acetate/petroleum ether the compound indicated in heading (a), having an M.P. of 131–133°, $[\alpha]_D^{20} = -7°$ in methanol, —4° in dimethyl formamide, is obtained.

(b) H-Arg(NO$_2$)-Phe-OMe.0.5H$_2$O.1.2HBr.—20 g. of Z-Arg(NO$_2$)-Phe-OMe are dissolved in 50 cc. of glacial acetic acid, and 50 cc. of 40% hydrobromic acid in glacial acetic acid are added with slight cooling. The reaction mixture is then allowed to stand at 20° for 1 hour with occasional shaking. The solution is completely concentrated by evaporation, whereupon the residue is dissolved in 200 cc. of water and washed twice with diethyl ether. The aqueous phase is completely concentrated by evaporation and the residue recrystallized from methanol/diethyl ether. The compound indicated in heading (b), having an M.P. of 165–167° (decomp.), $[\alpha]_D^{20} = +18°$ in methanol, +14° in dimethyl formamide, is obtained.

(c) Z-His(Z)-Arg(NO$_2$)-Phe-OMe.—46.1 g. of H-Arg(NO$_2$)-Phe-OMe.0.5H$_2$O.1.2HBr are dissolved in 100 cc. of water, the solution is heated and subsequently cooled. After the addition of chloroform and ice, the pH of the solution is adjusted to 9 with ammonia. The chloroform phase is again washed with water, is subsequently dried over sodium carbonate and filtered. A solution of 44.5 g. of Z-His(Z)-OH, 12.1 g. of N-hydroxy-succinimide in 200 cc. of acetonitrile and 100 cc. of pyridine is added to the filtrate, the reaction mixture is cooled to —20° and a solution of 21.1 g. dicyclohexyl carbodiimide in 70 cc. of acetonitrile is added. The solution is subsequently allowed to stand in a refrigerator for 4 hours with occasional stirring. The resulting precipitate is filtered off and the filtrate concentrated by evaporation. The residue is taken up in ethyl acetate and is subsequently washed as follows: 10% potassium carbonate solution (pH~10), water, saturated common salt solution, water, saturated common salt solution, sulphuric acid (pH 3), water, common salt solution. The ethyl acetate phase which has been dried over sodium sulphate is completely concentrated by evaporation, whereby a light beige foam is obtained. This foam is dissolved twice in a small amount of methanol and is precipitated each time with diethyl ether. The ether phases are decanted and the precipitate is dried; the compound indicated in heading (c) (amorphous foam), having an optical rotation of $[\alpha]_D^{20} = -8°$ in methanol, —8° in dimethyl formamide, is obtained.

(d) H-His-Arg-Phe-OMe.4HCl.—25 g. of Z-His(Z)-Arg(NO$_2$)-Phe-OMe are dissolved in 800 cc. of glacial acetic acid. 10 g. of 10% palladium on active charcoal are subsequently stirred in 200 cc. of N hydrochloric acid, and this is added to the solution. The reaction solution is hydrogenated for 2 hours and the catalyst is subsequently filtered off. 5 g. of 10% palladium on active charcoal in water are again added to the filtrate, hydrogenation is effected, this is completed after 5½ hours, whereby about 80% of the theoretical amount of hydrogen are taken up. The catalyst is filtered off and the filtrate is completely concentrated by evaporation, whereby the compound indicated in heading (d) is obtained as an amorphous foam.

(e) Trt-His(Trt)-Arg-Phe-OMe.HCl. — 21.5 g. of H-His-Arg-Phe-OMe.4HCl are dissolved in 100 cc. of pyridine and about 100 cc. of dimethyl formamide. Triethyl amine is added at about +5° until the pH of the solution amounts to 9, and a solution of 29 g. of trityl chloride in 300 cc. of pyridine is subsequently added dropwise during the course of 5 minutes. After the addition is completed the pH of the solution is determined from time to time, and, if necessary, is again adjusted to about 9 with triethyl amine. After about 4 hours the solution is concentrated by evaporation, the residue is taken up in chloroform and water and the pH of the solution is adjusted to 4 with the addition of a small amount of N hydrochloric acid. The chloroform phase is separated, is washed twice with water, dried over sodium sulphate and completely concentrated by evaporation. Ether is added to the residue and the diethyl ether is subsequently filtered off, whereby the compound indicated in heading (e) is obtained.

(f) Partial sequence C.—17 g. of Trt-His(Trt)-Arg-Phe-OMe.HCl are dissolved in 200 cc. of methanol and 40 cc. of hydrazine hydrate are added. The solution is subsequently allowed to stand at room temperature for two days. The solution is evaporated, the residue is dissolved in chloroform and washed twice with water. The chloroform phase is dried over sodium sulphate and concentrated by evaporation. The residue is subsequently washed with diethyl ether and filtered off; it is partial sequence C, having an optical rotation of $[\alpha]_D^{18}=-9°$ in dimethyl formamide.

Partial sequence D: H-Lys(BOC)-Asn-Leu-Asn-Asn-Tyr-AMe (a) Z-Asn-Tyr-OMe.—89 g. of Z-Asn-OCP and 31 g. of H-Tyr-OMe are dissolved in 500 cc. of dimethyl formamide, the solution is allowed to stand at room temperature over night and is precipitated in ether, the precipitate is filtered off and washed with diethyl ether, dissolved in dimethyl formamide and precipitated in water, the precipitate is filtered off, again washed with water and dried. The compound indicated in heading (a), having a M.P. of 199°, $[\alpha]_D 20=+6°$ in dimethyl formamide, is obtained.

(b) H-Asn-Tyr-OMe·HCl.—31 g. of Z-Asn-Tyr-OMe are dissolved in 500 cc. of dioxane and 85 cc. of N hydrochloric acid, hydrogenation is effected at 25° in the presence of a palladium catalyst, filtration is effected, the filtrate is evaporated, the residue is washed with diethyl ether and dried. The compound indicated in heading (b), having an optical rotation of $[\alpha]_D^{20}=+29°$ in dimethyl formamide, is obtained.

(c) Z-Asn-Asn-Tyr-OMe.—34.6 g. of H-Asn-Tyr-OMe·HCl and 57 g. of Z-Asn-OCP are dissolved in 500 cc. of dimethyl formamide, 6 cc. of glacial acetic acid and subsequently 14 cc. of triethyl amine are added. The reaction mixture is allowed to stand at 25° for 2 days and is precipitated in diethyl ether. The precipitate is dissolved in dimethyl formamide, precipitation is effected in water, the precipitate is filtered off and is again washed with water. The compound indicated in heading (c), having a M.P. of 220° $[\alpha]_D^{20}=-4°$ in dimethyl formamide, is obtained.

(d) H-Asn - Asn - Tyr - OMe·CH₃COOH.—42 g. of Z-Asn-Asn-Tyr-OMe are dissolved in 750 cc. of dimethyl formamide and 80 cc. of N acetic acid are added. Hydrogenation is effected at 25° in the presence of a palladium catalyst, filtration is effected and the filtrate is evaporated. The residue is dissolved in hot water and is freeze-dried. The compound indicated in heading (d), having a M.P. of 168°, $[\alpha]_D^{20}=-6°$ in dimethyl formamide, is obtained.

(e) Z-Leu-Asn-Asn-Tyr-OMe.—40 g. of Z-Leu-OCP and 33 g. of H-Asn-Asn-Tyr-OMe·CH₃COOH are dissolved in 500 cc. of dimethyl formamide, the solution is allowed to stand at 25° for 2 days and is precipitated in diethyl ether. The precipitate is dissolved in dimethyl formamide, precipitation is effected with water, the precipitate is filtered off and again washed with water. The compound indicated in heading (e), having a M.P. of 241°, $[\alpha]_D^{20}=-15°$ in dimethyl formamide, is obtained.

(f) H-Leu-Asn-Asn-Tyr-OMe.—34 g. of Z-Leu-Asn-Asn-Tyr-OMe are dissolved in 500 cc. of a mixture of dimethyl formamide/water (8:2) and hydrogenation is effected in the presence of a palladium catalyst at 20°. Filtration is effected and the filtrate is evaporated. The residue is dissolved in hot water and is freeze-dried. The compound indicated in heading (f), having a M.P. of 175°, $[\alpha]_D^{20}=-16°$ in dimethyl formamide, is obtained.

(g) Z-Asn-Leu-Asn-Asn-Try-OMe.—45 g. of Z-Asn-OCP and 26.5 g. of H-Leu-Asn-Asn-Tyr-OMe are dissolved in 500 cc. of dimethyl formamide, the solution is allowed to stand at 25° for 2 days, is added dropwise to diethyl ether, is filtered off, again washed with diethyl ether and dried. The residue is dissolved in dimethyl formamide, is precipitated with water, filtered off and again washed with water. The compound indicated in heading (g), having a M.P. of 255°, $[\alpha]_D^{20}=-18°$ in dimethyl formamide, is obtained.

(h) H-Asn-Leu-Asn-Asn-Tyr-OMe·CH₃COOH.—32.8 g. of Z-Asn-Leu-Asn-Asn-Tyr-OMe are dissolved in two liters of dimethyl formamide, hydrogenation is effected at 20° in the presence of palladium catalyst and 60 cc. of N acetic acid are added. The solution is filtered and the filtrate concentrated by evaporation. The residue is dissolved in hot water and freeze-dried. The compound indicated in heading (h), having a M.P. of 210°, $[\alpha]_D^{20}=-19°$ in dimethyl formamide, is obtained.

(i) Z-Lys(BOC)-Asn-Leu-Asn-Asn-Tyr-OMe.—12.6 g. of Z-Lys(BOC)-OCP and 11 g. of H-Asn-Leu-Asn-Asn-Tyr-OMe·CH₃COOH are dissolved in 500 cc. of dimethyl formamide, the solution is allowed to stand at 25° for two days, is added dropwise to ether, filtration, washing with ether and drying are effected. The residue is dissolved in dimethyl formamide, is precipitated with water, filtered off and again washed with water. The compound indicated in heading (i), having a M.P. of 242°, $[\alpha]_D^{20}=-20°$ in dimethyl formamide, is obtained.

(j) Partial sequence D.—11 g. of Z-Lys(BOC)-Asn-Leu-Asn-Asn-Tyr-OMe are dissolved in 300 cc. of dimethyl formamide and hydrogenation is effected at 20° and normal pressure in the presence of a palladium catalyst. The solution is filtered and the product precipitated in diethyl ether. The precipitate is washed with diethyl ether, whereby partial sequence D, having a M.P. of 221°, $[\alpha]_D^{20}=-26°$ in dimethyl formamide, is obtained.

Partial sequence E: Trt-Ser-Ala-Tyr-Trp-NH-NH₂

(a) H-Tyr-Trp-OMe.—85 g. of Z-Tyr(Z)-Trp-OMe are dissolved in a mixture of 1000 cc. of dioxane/water (8:2) with 145 cc. of N hydrochloric acid and hydrogenation is effected in the presence of a palladium catalyst until the taking up of hydrogen is completed. After filtering off the catalyst the solution is concentrated by evaporation and 500 cc. of water are added. The aqueous phase is washed with ethyl acetate and made alkaline with solid potassium hydrogen carbonate. After extracting repeatedly with diethyl ether and concentrating by evaporation the compound indicated in heading (a), having a M.P. of 85°, $[\alpha]_D^{20}=-2°$ in dimethyl formamide, is obtained.

(b) Trt-Ser-Ala-OMe.—60 g. of H-Ala-OMe·HCl and 130 g. of Trt-Ser-OH are dissolved in a mixture of 1400 cc. of acetonitrile/dimethyl formamide (1:1) and 60 cc. of triethyl amine are added. After adding 52 g. of N-hydroxysuccinimide the solution is cooled to 0° and is shaken with 97 g. of dicyclohexyl carbodiimide for 5 hours. After filtration the solution is concentrated by evaporation, ethyl acetate is added and the solution is washed with dilute acetic acid and potassium hydrogen carbonate solution. After drying, concentrating by evaporation and treating with diethyl ether the compound indicated in heading (b), having a M.P. of 146°, $[\alpha]_D^{20}=-56°$ in dimethyl formamide, is obtained.

(c) Trt-Ser-Ala-NH-NH₂.—82 g. of Trt-Ser-Ala-OMe are dissolved in 800 cc. of methanol and 80 cc. of hydrazine hydrate are added. The solution is allowed to stand at 20° for 24 hours, whereupon it is concentrated by evaporation and the residue washed with diethyl ether and water. The compound indicated in heading (c), having a M.P. of 126°, $[\alpha]_D^{20}=+38°$ in dimethyl formamide, is obtained.

(d) Trt-Ser-Ala-Tyr-Trp-OMe.—30 g. of Trt-Ser-Ala-NH-NH₂ are dissolved in 170 cc. of dimethyl formamide, the solution is cooled to —20° and 100 cc. of 2 N hydrochloric acid in dioxane are added. After the addition of 8.5 cc. of tert.-butyl nitrile the solution is stirred at —20° for a further 10 minutes and is combined with a dimethyl formamide solution containing 31 g. of H-Tyr-Trp-OMe·HCl and 50 cc. of triethyl amine. After shaking for 2 hours the solution is evaporated and the residue taken up in ethyl acetate. After washing out with dilute acetic acid, ammonia, drying over sodium sulphate and concentrating by evaporation, the compound indicated in heading (d), having a M.P. of 143°, $[\alpha]_D^{20}=+16°$ in dimethyl formamide, is obtained.

(e) Partial sequence E.—30 g. of Trt-Ser-Ala-Tyr-Trp-OMe are dissolved in 300 cc. of methanol and 30 cc. of hydrazine hydrate are added. The solution is allowed to stand at 20° for 24 hours and is evaporated. The residue is treated with diethyl ether and water. The resulting partial sequence E has a M.P. of 196°, $[\alpha]_D^{20}=+10°$ in dimethyl formamide.

Partial sequence F1: H-Thr-Cys(Bzl)-Val-Leu-OH (a) H-Cys(Bzl)-Val-Leu-OMe·HBr.—21. 0 g. of Z-Cys(Bzl)-OCP and 12.3 g. of H-Val-Leu-Ome·HCl are dissolved in 120 cc. of dimethyl formamide. 5.9 cc. of triethyl amine are subsequently added, the solution is allowed to stand at 25° for 16 hours, ethyl acetate is added, the solution is washed with dilute hydrochloric acid, is dried over sodium sulphate, evaporated to dryness, and the residue is crystallized from ethyl acetate/diethyl ether. Z-Cys(Bzl)-Val-Leu-OMe, having a M.P. of 160°, $[\alpha]_D^{20}=-28°$ in dimethyl formamide, is obtained and is dissolved in 210 cc. of a 40% solution of hydrogen bromide in glacial acetic acid. The solution is allowed to stand at 25° for 1 hour, is evaporated to dryness and the residue is recrystallized from isopropanol/diethyl ether. The compound indicated in heading (a), having a M.P. of 168°, $[\alpha]_D^{20}=+14°$ in dimethyl formamide, is obtained.

(b) H-Thr-Cys(Bzl)-Val-Leu-OMe·1.3 HBr.—20 g. of Z-Thr-NH-NH$_2$ are dissolved in 350 cc. of dimethyl formamide, the solution is cooled to −20°, 100 cc. of a solution of 2 N hydrochloric acid in dioxane are added and subsequently 10 cc. of tert.butyl nitrile are added. The solution is allowed to stand at −20° for 10 minutes, whereupon 45 cc. of triethyl amine and 25.5 g. of H-Cys(Bzl)-Val-Leu-OMe·HBr are added and the resulting mixture is shaken at 0° for 16 hours. The reaction mixture is evaporated to dryness, the residue is dissolved in a mixture of ethyl acetate/water, the organic phase is washed with dilute hydrochloric acid, dried over sodium sulphate and evaporated, and the residue is recrystallized from ethyl acetate. Z-Thr-Cys(Bzl)-Val-Leu-OMe, having a M.P. 208°, $[\alpha]_D^{20}=-27°$ in dimethyl formamide, is obtained. 20 g. of the tetrapeptide obtained above are dissolved in 200 cc. of a mixture of trifluoroacetic acid/ethyl acetate (1:1), a steam of gaseous hydrogen bromide is passed through the solution at 0° for 1 hour, the solution is subsequently evaporated and the residue is recrystallized from methanol/diethyl ether. The compound indicated in head (b), having a M.P. of 202°, $[\alpha]_D^{20}=-10°$ in dimethyl formamide, is obtained.

(c) Partial sequence F1.—372 g. of H-Thr-Cys(Bzl)-Val-Leu-OMe·1.3 HBr are dissolved in 1800 cc. of methanol, 900 cc. of 2 N sodium hydroxide solution are added, the solution is allowed to stand at 25° for 1 hour, 240 cc. of glacial acetic acid are added, and the solution is allowed to stand at 0° for 2 hours. The precipitated crystalline mass is filtered off, is first washed with N acetic acid, subsequently with water and is dried at 50° in a high vacuum. Partial sequence F1, having a M.P. of 219°, $[\alpha]_D^{20}=-53°$ in N ammonia, is obtained.

Partial sequence F2: BOC-Cys(Bzl)-Ser-Asn-Leu-Ser-NH-NH$_2$ (a) H-Asn-Leu-Ser-OMe·HCl.—43 g. of H-Leu-Ser-OMe·HCl and 53 g. of BOC-Asn-ONP are dissolved in 400 cc. of dimethyl formamide, 22 cc. of triethyl amine are added, the solution is allowed to stand at 25° for 16 hours, is evaporated to dryness, and the residue is recrystallized from methanol. 51.6 g. of BOC-Asn-Leu-Ser-OMe, having a M.P. of 190°, $[\alpha]_D^{20}=-24°$ in dimethyl formamide, are obtained and are dissolved in 500 cc of a 4 N solution of hydrochloric acid in methanol. The solution is allowed to stand at 25° for 1 hour, is evaporated to dryness, the residue is dissolved in methanol and precipitated with diethyl ether. The compound indicated in heading (a), having a M.P. of 180°, $[\alpha]_D^{20}=-23°$ in dimethyl formamide, is obtained.

(b) H-Ser-Asn-Leu-Ser-OMe·HCl.—39.5 g. of BOC-Ser-NH-NH$_2$ are dissolved in 500 cc. of dimethyl formamide, the solution is cooled to −20°, 200 cc. of a 2 N solution of hydrochloric acid in dioxane are added and subsequently 20 cc. of tert.butyl nitrite are added. The solution is allowed to stand at −20° for 10 minutes, whereupon 40 cc. of triethyl amine and 38.0 g. of H-Asn-Leu-Ser-OMe·HCl are added, the reaction mixture is subsequently stirred at 0° for 16 hours, is evaporated to dryness and the residue is recrystallized from chloroform/diethyl ether. BOC-Ser-Asn-Leu-Ser-OMe, having a M.P. 135°, $[\alpha]_D^{20}=-22°$ in dimethyl formamide, is obtained and is dissolved in 420 cc. of a 4 N hydrochloric acid solution in methanol. The solution is allowed to stand at 25° for 1 hour, is evaporated to dryness and recrystallized from methanol/ethyl acetate. The compound indicated in heading (b), having a M.P. of 155° (decomp.), $[\alpha]_D^{20}=-15°$ in dimethyl formamide, is obtained.

(c) Partial sequence F2.—18.5 g. of H-Ser-Asn-Leu-Ser-OMe·HCl and 18 g. of BOC-Cys(Bzl)-ONP are dissolved in 100 cc. of dimethyl formamide, 10 cc. of water, 3.5 cc. of acetic acid and 5.6 cc. of triethyl amine are added, the solution is allowed to stand at 25° for 16 hours, is evaporated to dryness and is recrystallized from methanol. 25.1 g. of BOC-Cys(Bzl)-Ser-Asn-Leu-Ser-OMe, having a M.P. of 182°, $[\alpha]_D^{20}=-17°$ in dimethyl formamide, are obtained and are dissolved in 200 cc. of dimethyl formamide with slight heating. 200 cc. of methanol and 20 cc. of hydrazine hydrate are added, the mixture is allowed to stand at 30° for 16 hours, is precipitated with diethyl ether, the precipitate is washed with diethyl ether/methanol (1:1) and the resulting partial sequence F2, having a M.P. of 224°, $[\alpha]_D^{20}=-13°$ in dimethyl formamide, is dried.

Partial sequence F BOC—Cys-Ser-Asn-Leu-Ser-Thr-Cys-Val-Leu-OH 18.4 g. of BOC-Cys(Bzl)-Ser-Asn-Leu-Ser-NH-NH$_2$ (partial sequence F2) are dissolved in 150 cc. of dimethyl formamide, the solution is cooled to −20°, 40 cc. of a 2 N solution of hydrochloric acid in dioxane and 15 cc. of tert.butyl nitrile are added. The solution is allowed to stand at −20° for 10 minutes, whereupon 28 cc. of triethyl amine and 16.2 g. of H-Thr-Cys(Bzl)-Val-Leu-OH (partial sequence F1) are added and the mixture is stirred at 25° for 16 hours. The reaction mixture is filtered, the solution is concentrated by evaporation and the residue washed with N acetic acid. BOC-Cys(Bzl)-Ser-Asn-Leu-Ser-Thr-Cys(Bzl)-Val - Leu - OH, having a M.P. of 217°, $[\alpha]_D^{20}=-17°$ in dimethyl formamide, is obtained.

The resulting product is dissolved in 5000 cc. of dried ammonia, sodium metal is added with stirring and while the ammonia boils, until a deep blue colouration is obtained. Decolouration is effected by adding ammonium chloride. The solution is evaporated to dryness and the residue is washed with N acetic acid and acetone. After drying BOC - Cys-Ser-Asn-Leu-Ser-Thr-Cys-Val-Leu-OH, having a M.P. of 248° (decomp.), $[\alpha]_D^{20}=-41°$ in dimethyl formamide/water (3:1), is obtained.

The obtained nonapeptide is dissolved in 5000 cc. of 0.01 N ammonia, N hydrogen peroxide is added while stirring until a negative nitroprussiate reaction is obtained, than 200 cc. of glacial acetic acid are added, filtration and lyophilization are effected. Partial secuence F, having a M.P. of 238° (decomp.), $[\alpha]_D^{20}=-18°$ in dimethyl formamide/water (3:1), is obtained.

Partial sequence ABC: H-His-Arg-Phe-Ser-Gly-Met-Gly-Phe-Gly-Pro-Glu-Thr-Pro-NH₂·3CH₃COOH (a) H-Ser-Gly-Met-Gly-Phe-Gly-Pro-Glu-Thr-Pro-NH₂·HCl.—6.7 g. of BOC-Ser-Gly-Met-Gly-OH (partial sequence B), 12 g. of H-Phe-Gly-Pro-Glu(OTB)-Thr-Pro-NH₂ (partial sequence A) and 2.1 g. of N-hydroxysuccinimide are dissolved in 50 cc. of dimethyl formamide and 20 cc. of acetonitrile, the solution is cooled to 0°, 4.0 g. of dicyclohexyl carbodimide are added, and the solution is allowed to stand at 0° for 16 hours. The solvent is removed by evaporation, the residue is washed with water, diethyl ether and ethyl acetate, and recrystallization is effected from chloroform. BOC-Ser-Gly-Met-Gly-Phe-Gly-Pro-Glu(OTB)-Thr-Pro-NH₂, having a M.P. of 121° (decomp.), [α]$_D^{20}$=—47° in dimethyl formamide, is obtained and is dissolved in 250 cc. of a solution of 8 N hydrogen chloride in dioxane. The solution is stirred at 25° for 2 hours, is evaporated to dryness and the residue is treated with diethyl ether. The compound indicated in heading (a), having a M.P. of 130° (decomp.), [α]$_D^{20}$=—48° in dimethyl formamide, is obtained.

(b) Partial sequence ABC.—9.9 g. of Trt-His(Trt)-Arg-Phe-NH-NH₂ (partial sequence C) are dissolved in 100 cc. of dimethyl formamide, the solution is cooled to —20°, 15 cc. of dioxane/2 H hydrochloric acid are added, and subsequently 1.16 cc. of tert.butyl nitrite are added, the mixture is stirred at —20° for 10 minutes, 28 cc. of triethyl amine and 10.0 g. of H-Ser-Gly-Met-Gly-Phe-Gly-Pro-Gly-Thr-Pro-NH₂·HCl are added, the mixture is stirred at 0° for 4 hours, is filtered and evaporated to dryness. The residue is dissolved in a mixture of ethyl acetate/methanol (8:2), the solution is washed with dilute ammonia and subsequently with water until neutral, is dried over sodium sulphate, concentrated to 100 cc. and precipitated by the addition of diethyl ether. The precipitate is again dissolved in dimethyl formamide, and the solution is precipitated by the addition of diethyl ether. Trt-His(Trt)-Arg-Phe-Ser-Gly-Met-Gly-Phe-Gly-Pro-Glu-Thr-Pro-NH₂, having a M.P. of 168° (decomp.), [α]$_D^{20}$=—43° in dimethyl formamide, is obtained and is dissolved in 500 cc. of acetic acid/water (8:2). The solution is heated at 90° for 20 minutes, is evaporated, the residue is washed in diethyl ether and dried in a high vacuum over potassium hydroxide shavings. Partial sequence ABC, having a M.P. of 180° (decomp.), [α]$_D^{20}$=—66° in acetic acid, is obtained.

Partial sequence DE: Trt-Ser-Ala-Tyr-Trp-Lys(BOC)-Asn-Leu-Asn-Asn-Tyr-NH-NH₂

(a) Trt-Ser-Ala-Trp-Lys(BOC)-Asn-Leu-Asn-Asn-Tyr-OMe.—4.3 g. of Trt-Ser-Ala-Tyr-Trp-NH-NH₂ are dissolved in 50 cc. of dimethyl formamide, and 8.2 cc. of a 2.3 N hydrogen chloride solution in dioxane are dissolved in this solution at —20° 1.3 cc. of a solution of tert.butyl nitrite/dioxane (1:1) are subsequently added dropwise at —20°, 3.5 cc. of triethyl amine and then 4.5 g. of H-Lys(BOC)-Asn-Leu-Asn-Asn-Tyr-OMe in 200 cc. of dimethyl formamide are added. The solution is stirred at room temperature for 3 hours and is subsequently filtered. The filtrate is concentrated by evaporation and the residue is pulverized with ethyl acetate. After filtering and washing with ethyl acetate and water the compound indicated in heading (a), having a M.P. of 240° (decomp.), [α]$_D^{20}$=—2° in dimethyl formamide, is obtained.

(b) Trt-Ser-Ala-Tyr-Trp-Lys(BOC)-Asn-Leu-Asn-Asn-Tyr-NH-NH₂: 6 g. of Trt-Ser-Ala-Tyr-Trp-Lys(BOC)-Asn-Leu-Asn-Asn-Tyr-OMe are dissolved in 60 cc. of dimethyl formamide, 6 cc. of hydrazine hydrate are added, and the solution is allowed to stand at room temperature for 2 days. The solution is subsequently evaporated and the residue is triturated with water, washed with water and ether. Partial sequence DE, having a M.P. of 244°, [α]$_D^{20}$=—9° in dimethyl formamide, is obtained.

Partial sequence ABCDE: H-Ser-Ala-Tyr-Trp-Lys(BOC)-Asn-Leu-Asn-Asn-Tyr-His-Arg-Phe-Ser-Gly-Met-Gly-Phe-Gly-Pro-Glu-Thr-Pro-NH₂·2AcOH (a) Trt-Ser-Ala-Tyr-Trp-Lys(BOC)-Asn-Leu-Asn-Asn-Tyr-His-Arg-Phe-Ser-Gly-Met-Gly-Phe-Gly-Pro-Glu-Thr-Pro-NH₂: 10.5 g. of Trt-Ser-Ala-Tyr-Trp-Lys(BOC)-Asn-Leu-Asn-Asn-Tyr-NH-NH₂ are dissolved in 200 cc. of dimethyl formamide, the solution is cooled to —20° and a solution of hydrochloric acid in dioxane is added. 1 cc. of tert.butyl nitrite is subsequently added dropwise and the solution is combined with a solution containing 10.5 g. of H-His-Arg-Phe-Ser-Gly-Met-Gly-Phe-Gly-Pro-Glu-Thr-Pro-NH₂ and 15 cc. of triethyl amine in 100 cc. of dimethyl formamide. After 2 hours the solution is precipitated with ether and is washed with chloroform and water. The compound indicated in heading (a), having a M.P. of 242°, [α]$_D^{20}$=—43° in dimethyl formamide, is obtained.

(b) Partial sequence ABCDE: 15 g. of Trt-Ser-Ala-Tyr-Trp-Lys(BOC)-Asn-Leu-Asn-Asn-Tyr-His-Arg-Phe-Ser-Gly-Met-Gly-Pro-Glu-Thr-Pro-NH₂ are dissolved in 500 cc. of 80% acetic acid, and the solution is allowed to stand at 40° for 2 hours. After concentrating by evaporation and treating with ether partial sequence ABCDE, having a M.P. of 238°, [α]$_D^{20}$=—23° in acetic acid, is obtained.

Partial sequence ABCDEF

Partial sequence ABCDEF

BOC—Cys-Ser-Asn-Leu-Ser-Thr-Cys-Val-Leu-Ser-Ala-Tyr-Lys(BOC)-Asn-Leu-Asn-Asn-Tyr-His-Arg-Phe-Ser-Gly-Met-Gly-Phe-Gly-Pro-Glu-Thr-Pro-NH₂ . acetate . trihydrate 1.0 g. of nonapeptide (partial sequence F) is dissolved in 10 cc. of dimethyl formamide, 1.5 g. of N-hydroxysuccinimide and 0.52 g. of dicyclohexyl carbodiimide are added, the solution is stirred at 25° for 6 hours, is filtered, and the filtrate is evaporated to dryness. The residue is washed with ethyl acetate and diethyl ether and dried.

BOC-Cys-Ser-Asn-Leu-Ser-Thr-Cys-Val-Leu-O-Su having a M.P. of 242°, is obtained and is dissolved in 10 cc. of dimethyl formamide. 3.1 g. of tricosapeptide diacetate (partial sequence ABCDE) and 1.2 g. of N-hydroxysuccinimide are added to this solution and stirring is effected at 25° for 16 hours. The solution is evaporated to dryness, the residue is washed with diethyl ether, chloroform and acetone. The crude, protected dotriacontapeptide is obtained and is dissolved in 50 cc. of a mixture of chloroform/methanol/water (70:30:5). The resulting solution is placed on a silica gel column (5×100 cm.), which has been balanced with the mixture indicated above. Elution is effected with an increasing concentration of methanol. The combined fractions, which contain the pure peptide, are evaporated, subsequently washed with diethyl ether and dried over potassium hydroxide in a high vacuum. Partial sequence ABCDEF, having a M.P. of 240° (decomp.), [α]$_D^{20}$=40° in N acetic acid/methanol (2:1), is obtained.

Composition of amino acids after acid hydrolysis (6 N, 16 hours): Ala$_{1.1}$, Arg$_{1.0}$, Asp$_{3.9}$, Cys/2$_{1.6}$, Glu$_{1.2}$, Gly$_{3.0}$, His$_{1.1}$, Leu$_{2.9}$, Lys$_{1.0}$, Met$_{1.0}$, Phe$_{2.0}$, Pro$_{2.1}$, Ser$_{3.8}$, Thr$_{1.9}$, Tyr$_{1.9}$, Val 0.9 (Trp 1.0 by spectrophotometry).

What is claimed is:

1. A compound selected from the group consisting of L-cysteinyl-L-seryl - L - asparaginyl - L - leucyl-L-seryl-L-threonyl-L-cysteinyl-L-valyl - L - leucyl-L-seryl-L-alanyl-L - tyrosyl-L-tryptophanyl-L-lysyl-L-asparaginyl-L-leucyl-L-asparaginyl-L-asparaginyl - L - tyrosyl-L-histidyl-L-arginyl-L-phenylalanyl-L-seryl-glycyl - L - methionyl-glycyl-L-phenylalanyl - glycyl-L-prolyl-L-glutamyl-L-threonyl-L-prolinamide and its physiologically acceptable acid addition salts and physiologically acceptable heavy metal complexes.

References Cited
UNITED STATES PATENTS
3,352,844  11/1967  Boissonnas et al. ___ 260—112.5

FOREIGN PATENTS
6,815,962  5/1969  Netherlands _____ 260—112.5

OTHER REFERENCES
Rittel et al.: Helv. Chim. Acta 51, 924–928 (1968).
Neher et al.: Helv. Chim. Acta 51, 1900–1905 (1968).
Sieber et al.: Helv. Chim. Acta 51, 2057–2061 (1968).
Schroder et al.: The Peptides, vol. II, Academic Press, New York (1966), pp. 320–330 and 366–373.

Brewer, Calcitmin, 1969, Proceeding of the Second International Symposium, London, July 21–24, 1969, William Heinemann Medical Books, Ltd., London (1970). Effective date August 1969, pp. 14–27.

Brewer et al.: Proc. Natl. Acad. Sci. 63, 940–947 (1969).

LEWIS GOTTS, Primary Examiner

R. J. SUYAT, Assistant Examiner

U.S. Cl. X.R.

260—112; 424—177